Aug. 10, 1954     C. W. YOUNG     2,685,998
LEAKPROOF BARREL FILLER
Filed Jan. 2, 1952
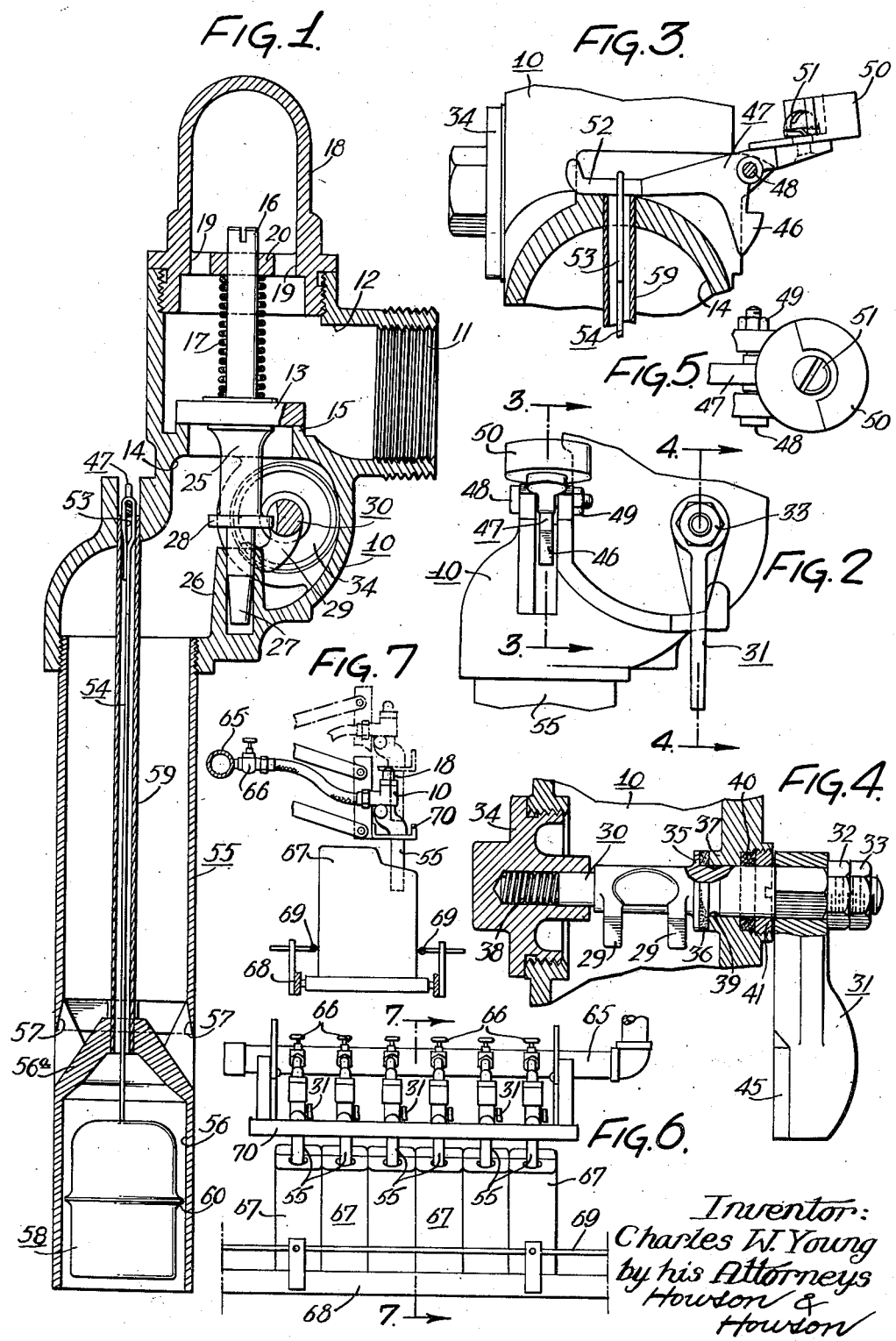
Inventor:
Charles W. Young
by his Attorneys
Howson &
Howson Patented Aug. 10, 1954

2,685,998

UNITED STATES PATENT OFFICE 2,685,998

LEAKPROOF BARREL FILLER

Charles W. Young, Drexel Hill, Pa., assignor to Pennsylvania Flexible Metallic Tubing Co., Philadelphia, Pa., a corporation of Pennsylvania Application January 2, 1952, Serial No. 264,605

2 Claims. (Cl. 226—127)

This invention relates to drum fillers and more particularly to the type having means for automatically shutting off the flow of fluid to the drum when the fluid level reaches a predetermined height.

Automatic drum fillers are well-known and have been widely used for many years. The Carll Patent No. 1,233,024 is illustrative of such fillers and the present invention is directed specifically to improvements on this structure which render it suitable for specialized applications in which previous automatic fillers could not safely be employed.

The requirements of modern mechanized and aerial warfare are such that fuel storage depots at advanced bases are set up at which individual vehicles or individual containers such as the familiar "jeep" cans are filled with gasoline or aviation fuel. The mechanism used for filling these cans forms no part of the present invention, but it wil be described briefly because the use of such mechanism presents peculiar problems which are solved satisfactorily and safely only by the present invention.

In the present specification, the term "barrel" filler is used to describe the apparatus to which the invention has been applied, but it will be understood that any liquid receptacle, whether it be a drum, can, or fuel tank, may be used with the device. Originally, fillers of this sort were used only for oil drums or barrels, and therefore, if moderate or slight leakage occurred or if the shut-off valve did not always function properly, no serious fire or explosion hazard was presented. However, it is now required that a gang of fillers be connected to a large gasoline main in such a way that as many as five or more "jeep" cans on a conveyor are filled simultaneously, and also there may be a plurality of stations at which the simultaneous filling occurs at close proximity to one another. Under these conditions, it will be apparent that there must be absolutely no leakage of highly volatile fluid. Furthermore, the action of the shut-off valve in each filler must be positive and foolproof, otherwise a substantial quantity of the fuel could be spilled and ignited, with the loss of the entire fuel depot and personnel in the matter of a few seconds.

In view of the above requirement, it will be appreciated that the positive elimination of all leaks in a device of this sort, together with absolute certainty in the operation of the shut-off valve, presented a problem not easy of solution. In the first place, the float in the old type of filler would occasionally stick, thus permitting fluid to overflow, also leakage of fluid sometimes occurred around the valve actuating shaft.

A primary object of the present invention, therefore, is to provide in an automatic barrel filler positive actuating means for the shut-off valve.

A further object of the invention is to provide in an automatic shut-off barrel filler an improved construction eliminating leakage when the filler is used for highly volatile liquid solvents.

A further object of the invention is to provide an improved non-leak seal for an automatic shut-off barrel filler.

Further objects will be apparent from the specification and drawings in which:

Fig. 1 is a longitudinal sectional view of my improved barrel filler;

Fig. 2 is a fragmentary detail showing the trip lever and valve latch of my improved filler;

Fig. 3 is an enlarged sectional detail as seen at 3—3 of Fig. 2;

Fig. 4 is an enlarged sectional detail as seen at 4—4 of Fig. 2;

Fig. 5 is an enlarged detail in plan of the adjusting mechanism for the trip lever;

Fig. 6 shows the installation in which a gang of drum fillers are to be used in conjunction with a conveyor; and Fig. 7 is a section as seen at 7—7 of Fig. 6.

Referring now more particularly to the drawings, my improved drum filler comprises a main housing 10 having a threaded fluid inlet connection 11 which communicates with a chamber 12 in the upper part of the housing. A spring loaded mushroom type valve 13 permits fluid in chamber 12 to pass into the lower chamber 14 when the valve is raised from valve seat 15. A valve guide 16 is secured to the upper part of valve 13 and is surrounded by a suitable compression spring 17. Valve guide 16 extends into cap 18 provided with fluid passages 19, 19, and is slidably retained in a spider 20. Spring 17 is compressed between spider 20 and the valve when it is raised.

The valve stem 25 is guided in a boss 26 and the end of the stem is tapered at 27 to minimize any tendency for the valve to stick. Vertical actuation of the valve is provided through a flange 28 on the valve stem 25 which cooperates with a pair of cam fingers 29, 29 on the valve actuating shaft 30. Shaft 30 is rotatably mounted in housing 10 as shown in Fig. 4, the outboard end of the shaft extending through the housing and carrying a latch 31 non-rotatably secured to the squared end of the shaft by means of nut 32 and lock nut 33. The opposite end of the shaft is journaled in a removable cap 34 tightly threaded into the housing 10.

Since the shaft 30 must be operated externally of the chamber 10, it is extremely important that suitable sealing means for the shaft be provided. In the improved construction, I provide a double seal for the shaft, each element thereof acting both axially and radially. One seal, however, serves additionally as a thrust bearing for the shaft. An integral flange 35 on shaft 30 compresses a "Teflon" washer 36 against an internal annular boss 37 by means of a compression spring 38 in cap 34. The shaft is provided with an annular relief groove 39 contiguous to and in back of washer 36. The outer "Teflon" seal or washer 40 for the shaft is pressed into radial engagement therewith by means of a gland nut 41 as shown clearly in Fig. 4 and pressure of the nut 41 seals the washer 40 against housing 10 to prevent leakage therebetween. Particular emphasis is directed to the "Teflon" seals or washers 36 and 40. As noted above, it is of paramount importance to eliminate any possibility of leakage when the barrel filler is used for volatile liquids and particularly solvents such as gasoline, naphtha, and acetone. I have found that a polymer of tetrafluroethylene is the only material known which has the required properties for such a sealing. This material is chemically inert and is therefore not attacked by solvents with which drums or barrels may be filled. It has satisfactory tensile strength, and above all, it does not require lubrication even under the pressures needed to effect proper mechanical sealing. I have found, therefore, that this material permits adequate sealing pressure to be applied by means of spring 38 and also gland nut 41. The elimination of lubrication or what is more important, the elimination of the harmful effects incident to improper or insufficient lubrication, even under substantial pressure permits long life and leakproof operation of my barrel filler. "Teflon" is the trade name for a polymer of tetrafluoroethylene manufactured and sold by the E. I. du Pont de Nemours Company.

Referring now to Figs. 1–3 it will be noted that latch 31 pivots through an angle of substantially 90° to raise and lower valve 13 by means of fingers 29, 29. The valve is retained in an open or raised position against the pressure of spring 17 when the beveled edge 45 of latch 31 seats on top of the shoulder 46 on pivoting trigger 47. Fig. 3 shows the trigger in position for retaining the valve open. The trigger is mounted on a removable bolt 48 secured in the housing by means of a lock nut 49. It is also provided with a counterweight 50 which may be rotated around screw 51 to insure that the trigger 47 returns to a reset position after the latch 31 has been released. The opposite end 52 of the trigger passes through an eye 53 in float rod 54 as shown in Fig. 2 and the top of end 52 is rounded to conform to the inner contour of the eye, an important feature in preventing sticking.

Liquid passing from chamber 12 into chamber 14 flows downwardly therethrough and into a spout or nozzle 55 which carries a float chamber 56 at its lower end. The float chamber 56 is open at the bottom only, so that liquid falling downwardly through nozzle 55 passes outwardly and over the top of float chamber 56 through orifices 57, 57. In this way, the float 58 is not affected by the velocity of inflowing liquid. The float rod 54 which is connected to float 58 extends upwardly through a guide or sleeve 59 and is hung on the trigger 47 as previously described. The bottom of sleeve 59 fits tightly in the cap 56a of the float chamber 56 so that the only liquid entrance to the chamber is through the bottom thereof. Furthermore, the bore of sleeve 59 is considerably greater than the diameter of rod 54 so that the only contact between the float and the rod and the barrel filler is at an annular flange 60 around the float and at the trigger 47. In this way, it will be observed that lateral contact and movement of the float and rod are reduced to a minimum and this feature is important in preventing binding or sticking in the spout or housing.

In operation at a refuelling depot, a plurality of barrel fillers are connected to a fuel main 65 as shown in Fig. 6. Suitable hand valves 66, may be installed between the main and each filler. For expeditious filling, a plurality of "jeep" cans 67 are carried on conveyor 68 between side rails 69, 69. The conveyor 68 is run intermittently so that, for example, 6 cans are stopped in line with a raised gang of fillers. The gang is then swung downwardly by means of a bracket 70 to insert the filler spouts into the cans. The individual valves 66, or a main valve not shown is opened to permit fluid to flow into the cans as soon as the latches 31, 31 on each filler have been set. When the fluid level in the cans reaches a predetermined level, the float 58 in each filler rises to pivot the triggers 47, 47 thus releasing latches 31, 31 and automatically closing valves 13, 13. As soon as all of the valves have tripped, bracket 70 is raised and the conveyor started, so that the next group of cans may be similarly filled.

It will thus be understood that I have provided an extremely safe and practical automatic barrel filler which can be used for the simultaneous filling and handling of large quantities of highly volatile fuel or solvent. The device is foolproof and leakproof and therefore can be used indefinitely with a minimum of servicing and complete safety.

Having thus described my invention, I claim:

1. In an automatic barrel filler of the type having a housing, a fluid inlet in the upper part of said housing, a fluid outlet in the lower part of said housing, a spout connected to said housing at the fluid outlet, a spring loaded valve providing fluid communication between the upper and the lower parts of the housing, a latch for holding the valve in an open position, and a float actuated mechanism for tripping said latch when the float is raised to a predetermined level, the improvement that comprises: a trigger pivotally mounted on said housing, walls defining a fluid outlet in the spout, a float chamber at the bottom of said spout, said float chamber being positioned below the fluid outlet in the spout and shielded therefrom, a sleeve secured in the top of the float chamber and extending to a point in registry with the trigger, a float in the float chamber, a float rod extending upwardly through the sleeve and secured to the trigger, a rotatable shaft journaled in the filler housing, means on said shaft for actuating the valve, an annular shoulder on said shaft, a synthetic plastic washer between the shoulder and the inside of the housing, a spring between one end of the shaft and the housing urging the shoulder into axial sealing engagement with the washer, a second synthetic plastic washer surrounding the shaft, a gland nut adjustable from the outside of the housing and compressing said second washer in the housing and against the shaft, and a latch connected to the shaft on the outside of the housing for rotating the shaft in the housing to open and close the valve.

2. Apparatus in accordance with claim 1 in which both of the washers are formed of a polymer of tetrafluoroethylene.

References Cited in the file of this patent

UNITED STATES PATENTS

| Number | Name | Date |
|---|---|---|
| 915,725 | Baines et al. | Mar. 23, 1909 |
| 1,001,249 | Carll | Aug. 22, 1911 |
| 1,064,208 | Hardwick | June 10, 1913 |
| 1,400,275 | Fisk | Dec. 13, 1921 |